Patented Jan. 13, 1931

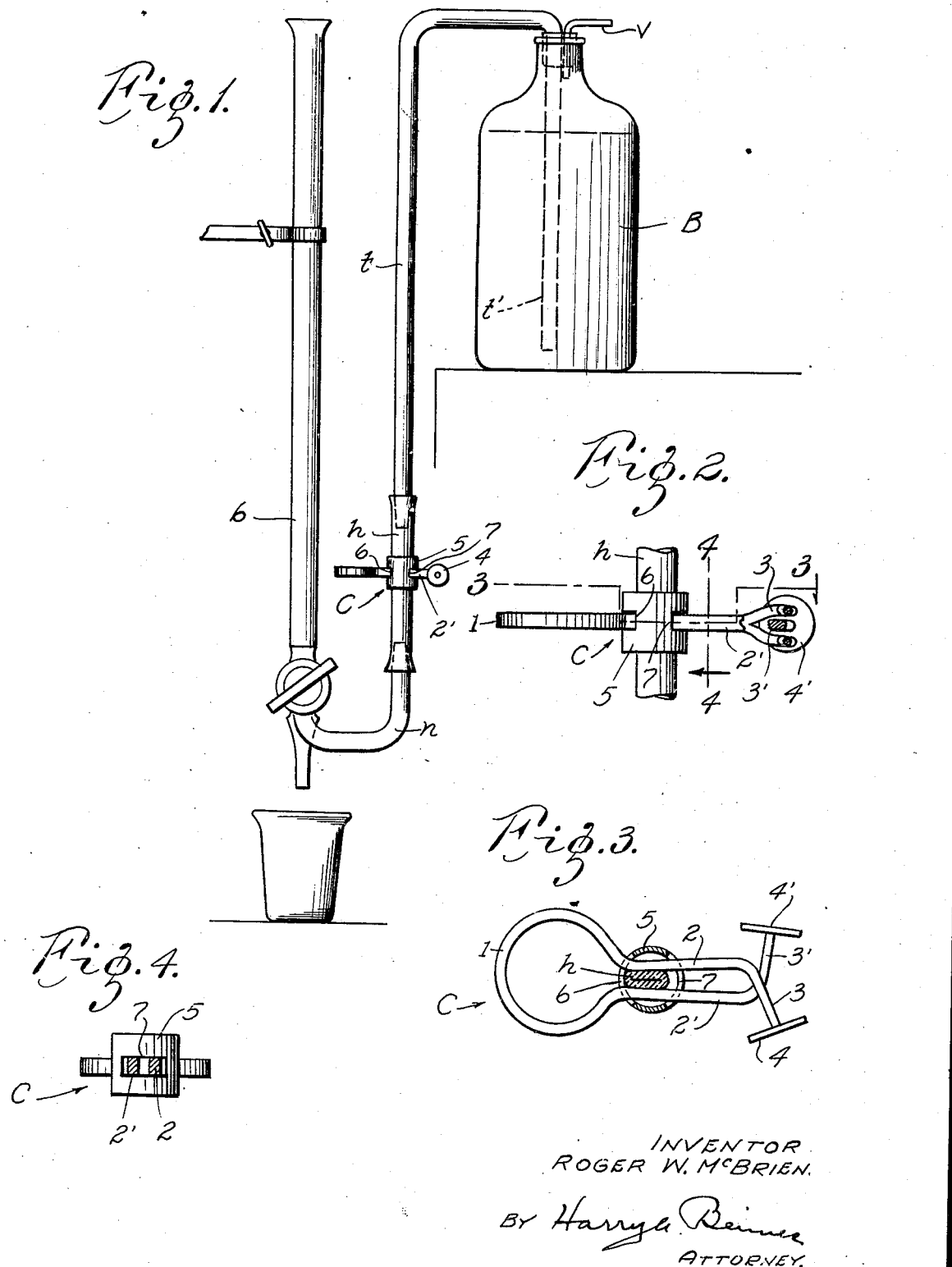

1,789,013

UNITED STATES PATENT OFFICE

ROGER W. McBRIEN, OF ALTON, ILLINOIS

CLAMP FOR HOSE OR COMPRESSIBLE TUBING

Application filed June 10, 1929. Serial No. 369,754.

My invention has relation to improvements in clamps for hose or compressible tubing, and consists in the novel features of construction more fully hereinafter described and claimed.

The principal object of the invention is to provide a spring clamp for pressing together the walls of the tubing and thus constricting the same when not in use, and at the same time hold the tubing against movement away from the most effective part of the clamp. The manner of accomplishing this object, together with other advantages inherent in the device, will be better apparent from a detailed description of the invention in connection with the accompanying drawings, in which:

Figure 1 is an elevational view of a commonly used chemical apparatus embodying a hose connection on which my improved clamp is positioned; Fig. 2 is a side elevation of the clamp; Fig. 3 is a combined plan and horizontal section taken on the line 3—3 of Fig. 2; and Fig. 4 is a cross sectional detail taken on the line 4—4 of Fig. 2.

Referring to the drawings, B represents a bottle containing a liquid chemical, which it is desired to use in a titration operation for which purpose a burette $b$ is provided. The refilling neck $n$ of the burette is connected to tubing $t$ by a piece of rubber hose $h$ and the upper end $t'$ of the tubing is disposed in the bottle B. A vent tube $v$ is provided to permit the entry of air into the bottle B, as is well understood in the art. Obviously, the communication between the bottle B and the burette $b$ is closed off at all times, except when it is necessary to refill the burette from the bottle, and in order that the flow of liquid to the burette may be controlled, my improved clamp C is availed of for normally constricting and compressing the hose $h$ and thus constricting the opening therethrough.

By referring to Fig. 3 it will be seen that the clamp C consists of a circular spring portion from which a pair of clamp arms 2, 2' extend. The arm 2 terminates in a laterally bent finger 3, and the arm 2' terminates in a laterally bent finger 3', said fingers crossing each other and the finger 3 being slotted so as to allow finger 3' to traverse it. On the ends of fingers 3, 3' there are discs 4, 4' to facilitate the pressing together of the fingers by the operator for the purpose of spreading open the clamp arms 2, 2' to release the pressure on the tube $h$ when it is desired to permit the flow of liquid from the bottle B to the burette $b$. A sleeve 5 is mounted on the arms 2, 2', said arms traversing slots 6 and 7 in opposed relation. When the sleeve is in its most effective position in close proximity to the ring 1, and the hose clamped within it, there is a small amount of clearance between clamp arms 2, 2' and the ends of slots 6 and 7. Therefore it is possible for the arms 2, 2' to be spread apart sufficiently to open the hose $h$ for the purpose of allowing the liquid to pass through. However, the sleeve 5 will not allow the arms 2, 2' to be spread to such an extent as to entirely free the hose, but on the other hand, will always retain a sufficient grip on the hose to prevent its sliding back and forth between the clamp arms 2, 2'. It will be observed that the arms 2, 2' are inclined relatively to each other and every time the clamp is operated to spread these arms, there will be a wedging action on the sleeve 5 to force it inwardly toward the ring 1. Thus it is practically impossible for the hose $h$ to work outwardly where the pressure exerted on it by the arms 2, 2' is not sufficient to hold it closed.

In the types of clamp now in use, the hose $h$ may move freely when clamp arms are spread to unclamp it, and it often happens that the hose moves to a position adjacent to the fingers corresponding to fingers 3, 3', where there is not sufficient pressure to constrict it. Obviously, this defect causes considerable annoyance and often results in spoiling a test that must be performed with great accuracy.

Having described my invention, I claim:

1. A clamp of the character described comprising a pair of clamp arms adapted to receive between them the object clamped, a spring connection between said arms for holding them in clamping position, said arms diverging from said connection, and a collar slidably mounted on said arms, the arms traversing oppositely disposed slots in said collar.

2. A clamp of the character described comprising a pair of clamp arms adapted to grip the object clamped, a spring connection at one end of said arms, means disposed on said arms for limiting the degree of separation thereof, said means cooperating with the object gripped to prevent accidental displacement thereof and terminal fingers on the arms adapted to be pressed together for releasing the object from the grip of the arms.

In testimony whereof I hereunto affix my signature.

ROGER W. McBRIEN.